United States Patent
Bouaziz

(10) Patent No.: US 11,489,820 B2
(45) Date of Patent: Nov. 1, 2022

(54) METHOD FOR SECURE STORAGE, IN A NETWORK, OF A CONTAINER IMAGE IN A CONTAINER REGISTRY

(71) Applicant: BULL SAS, Les Clayes Sous Bois (FR)

(72) Inventor: M'hamed Bouaziz, Massy (FR)

(73) Assignee: BULL SAS, Les Clayes Sous Bois (FR)

( * ) Notice: Subject to any disclaimer, the term of this patent is extended or adjusted under 35 U.S.C. 154(b) by 370 days.

(21) Appl. No.: 16/568,846

(22) Filed: Sep. 12, 2019

(65) Prior Publication Data
US 2020/0084187 A1  Mar. 12, 2020

(30) Foreign Application Priority Data
Sep. 12, 2018 (FR) ..................... 18 58165

(51) Int. Cl.
*H04L 9/40* (2022.01)
*G06F 21/60* (2013.01)
(Continued)

(52) U.S. Cl.
CPC ........ *H04L 63/0435* (2013.01); *G06F 21/602* (2013.01); *H04L 9/0863* (2013.01); *H04L 67/01* (2022.05)

(58) Field of Classification Search
CPC ... H04L 63/0435; H04L 9/0863; H04L 67/42; H04L 63/0853; G06F 21/602;
(Continued)

(56) References Cited

U.S. PATENT DOCUMENTS

2008/0059799 A1* 3/2008 Scarlata ............... H04L 9/0897
713/176
2014/0115328 A1 4/2014 Allen et al.
(Continued)

FOREIGN PATENT DOCUMENTS

EP         1 953 668 A2    8/2008
WO   WO-2008094839 A1 *  8/2008  ......... G06F 21/6218

OTHER PUBLICATIONS

Preliminary Search Report issued in French Patent Application No. 1858165 dated Jan. 10, 2020 with partial English machine translation provided.

*Primary Examiner* — Robert B Leung
*Assistant Examiner* — Bruce S Ashley
(74) *Attorney, Agent, or Firm* — Meagher Emanuel Laks Goldberg & Liao, LLP

(57) ABSTRACT

Disclosed is a method for the secure storage, in a network, of a container image in a container registry, including sending a container image, this container image corresponding to an initial state of a client machine environment which can subsequently be used to execute this container, from a client machine of the network to a container registry of a server machine of the network remote from the client machine. The method also includes encrypting this container image, carried out in the random access memory of the client machine before sending to the server machine, so that the container image is already encrypted when received by the container registry for storage therein, and in that the encryption key of this container image is usable in the random access memory of the client machine, inaccessible in the mass storage of the client machine, and inaccessible on the server machine.

21 Claims, 2 Drawing Sheets

(51) Int. Cl.
*H04L 9/08* (2006.01)
*H04L 67/01* (2022.01)

(58) Field of Classification Search
CPC ......... G06F 2009/4557; G06F 9/45558; G06F 2221/2107; G06F 21/62; G06F 21/78; G06F 21/82; G06F 21/57; G06F 21/53
See application file for complete search history.

(56) References Cited

U.S. PATENT DOCUMENTS

| | | | |
|---|---|---|---|
| 2016/0253517 A1* | 9/2016 | Mori | H04L 9/14 |
| | | | 713/165 |
| 2017/0099144 A1* | 4/2017 | Sobel | H04L 63/083 |
| 2017/0180346 A1 | 6/2017 | Suarez et al. | |
| 2018/0088993 A1* | 3/2018 | Gerdesmeier | G06F 9/5077 |
| 2018/0349610 A1* | 12/2018 | Gupta | G06F 21/572 |

* cited by examiner

METHOD FOR SECURE STORAGE, IN A NETWORK, OF A CONTAINER IMAGE IN A CONTAINER REGISTRY

FIELD OF THE INVENTION

The invention relates to the field of methods for the secure storage, in a network, of a container image in a container registry.

BACKGROUND OF THE INVENTION

According to a first prior art, in a network including a container registry located on a server machine and offering a storage service to one or more client machines of this network, the storage can be secured by encrypting, at the container registry, the container images received by the container registry, before actually storing them in the container registry.

This protects the contents of the container images stored in the container registry against an intrusion originating from outside the container registry. However, this does not provide good protection of the contents of container images stored in the container registry against an intrusion originating from inside the container registry, in particular against a malicious intrusion by the administrator of this container registry, a particular problem considered by the invention, or even against incompetence by the administrator of this container registry with ultimately the same effects.

According to a second prior art, another option consists of only storing the images of truly confidential containers at the client machine and in encrypted form, but then the rich features offered by the container registry, at the client machine scale or even at the scale of interactions between several different client machines, can no longer be used.

To ensure the confidentiality of the container images stored in a container registry, even against the administrator of the container registry, and thus benefit from the wealth of features offered by this container registry, the invention is then faced with the following dilemma:
  either the encryption is performed at the server machine, and in this case the confidentiality of the container images stored in the container registry is not assured against the administrator of the container registry, or against another malicious attack carried out at an internal management element of this container registry,
  or the encryption is performed at the client machine, and in this case:
    either the decryption operation at the client machine, or at a compute node used by the client machine, can become difficult if the decryption key is not stored therein,
    or confidentiality is no longer ensured against the administrators of the different compute nodes on which the client machine may be installed over time, not necessarily always remaining on its input node in the network, if the decryption key is to be stored, possibly with its password, on the compute node where the client machine is installed when it wants to download a container image from the container registry in order to execute the container corresponding to this container image, on this compute node.

SUMMARY OF THE INVENTION

The object of the present invention is to provide a method for the secure storage, in a network, of a container image in a container registry, which at least partially overcomes the above disadvantages.

More particularly, the invention aims to then provide an encryption of the container image at the client machine, on request, before sending it to the container registry of the server machine, and/or a decryption of the container image then downloaded in encrypted form, upon receipt of the download, by the one-time sending of the decryption key usable for the decryption of this one download and under secure conditions.

For this purpose, the invention proposes that:
  the encryption key for this container image is usable in the random access memory of the client machine, inaccessible in the mass storage of the client machine, and inaccessible on the server machine,
  and/or the decryption key for this container image is usable in the random access memory of the client machine, inaccessible in the mass storage of the client machine, and inaccessible on the server machine.

To this end, the invention proposes a method for the secure storage, in a network, of a container image in a container registry, comprising: a step of sending a container image, this container image corresponding to an initial state of a client machine environment which can subsequently be used to execute this container, from a client machine of the network to a container registry of a server machine of the network that is remote from the client machine, characterized in that that the storage method also comprises: a step of encrypting this container image, carried out in the random access memory of the client machine before the step of sending to the server machine, so that said container image is already encrypted when received by the container registry for storage therein, and in that: the encryption key of this container image is usable in the random access memory of the client machine, inaccessible in the mass storage of the client machine, and inaccessible on the server machine.

To this end, the invention also proposes a method for the secure retrieval, in a network, of a container image stored in a container registry, comprising: a step of downloading a container image to a client machine of the network, this container image corresponding to an initial state of a client machine environment which can subsequently be used to execute this container, the image being stored in encrypted form in a container registry of a server machine of the network that is remote from the client machine, characterized in that the retrieval method also comprises: a step of decrypting this container image, carried out in the random access memory of the client machine, after the step of downloading from the server machine, so that the container image is still encrypted when received by the client machine, and in that: the decryption key of this container image is usable in the random access memory of the client machine, inaccessible in the mass storage of the client machine, and inaccessible on the server machine.

To this end, the invention also proposes a network of nodes, comprising a container registry, using a secure storage method according to the invention and a secure retrieval method according to the invention.

According to preferred embodiments, the invention comprises one or more of the following features which can be used separately or in any combination of the abovementioned objects of the invention.

Preferably, the sending step is carried out on an input node of the client machine of the network, the encryption step is carried out on the input node, the execution of the container will be carried out on a compute node of the client machine of the network, and the compute node is distinct from the input node.

Preferably, the downloading step is carried out on a compute node of the client machine of the network, the decryption step is carried out on the compute node, the execution of the container by using the decrypted container image is carried out on the compute node, the decryption key is sent from an input node of the client machine of the network to the compute node, the compute node is distinct from the input node, and the decryption key is usable one time only in the random access memory of the compute node in order to carry out the decryption of the container image to be decrypted in order to subsequently launch the execution of the container, but remains inaccessible via the mass storage of the compute node.

Thus, the fact that the step of sending the container image is carried out on an input node that is distinct from the compute node on which the container will then be executed, makes the operations of encrypting and/or decrypting the container images more delicate and more complex, thus rendering even more attractive the methods for the secure storage and/or retrieval of container images in a container registry proposed by the invention.

Preferably, the encryption key is introduced in encoded form on the client machine, the encryption key is accompanied by a decoding password enabling it to be decoded, and the encoded encryption key and the decoding password are found together only in the random access memory of the client machine in order to encrypt the container image.

Preferably, the decryption key is introduced in encoded form on the client machine, the decryption key is accompanied by a decoding password enabling it to be decoded, and the encoded decryption key and the decoding password are found together only in the random access memory of the client machine in order to decrypt the encrypted container image.

Preferably, the decryption key is introduced in encoded form on the input node, the decryption key is accompanied by a decoding password enabling it to be decoded, and the encoded decryption key and the decoding password are sent separately from the input node to the compute node and are found together only in the random access memory of the compute node in order to decrypt the encrypted container image.

Thus, the separation of the encryption and/or decryption key into two parts, namely the key itself but in encoded form and the associated decoding password, will improve the confidentiality of the container images stored in the container registry, making it much more difficult to pirate these container images stored encrypted in the container registry, even for network administrators, particularly the container registry administrator and the administrators of the compute nodes on which the client machines may be installed over time.

Preferably, the encryption step is first preceded by a step of creating a container image on the client machine, possibly on the input node.

Since the operation of encrypting the container image is not necessarily carried out on the same physical machine or the same virtual machine as the operation of executing the corresponding container, the secure storage method according to the invention is thus made all the more attractive.

Preferably, the encryption key is a symmetric key.

Preferably, the decryption key is a symmetric key.

The encryption key and decryption key are thus identical; the encryption and/or decryption operations are then faster and simpler, which is of particular interest here, given the circulation of the container images, encryption and/or decryption keys, and any associated decoding passwords, between the container registry, the input node, and possibly different compute nodes.

Preferably, the step of encrypting the container image is carried out just before the step of sending this container image, between the request to send the container image made by the user of the client machine and the actual sending of the encrypted container image to the server machine.

The encryption operation is thus performed at the last moment, when it is still truly useful, avoiding encryption operations that are unnecessary because they are not followed by actual sends to the container registry, but sufficiently in time to fully provide the desired confidentiality.

Preferably, the step of encrypting the container image is integrated into a command line for the sending of this container image, from the client machine to the server machine, in the form of an additional encryption layer.

Preferably, the encryption key is passed as an argument of this command line for sending.

Preferably, the step of decrypting the container image is integrated into a command line for the downloading of this container image from the client machine to the server machine, in the form of an additional decryption layer.

Preferably, the decryption key is passed as an argument of this command line for downloading.

The timing of the encryption operation and/or decryption operation is thus optimized, while their implementation is both simplified and better automated.

Preferably, the encryption step is carried out automatically before any container image is sent from the client machine to the server machine.

The automation is thus complete.

Preferably, the encryption step is carried out after automatically querying the user of the client machine followed by the user of the client machine accepting such encryption.

Thus, only truly confidential container images will need to be encrypted before being sent to the container registry.

Preferably, the container registry comprises at least: a function for adding a container image to the registry; a function for deleting a container image from the registry; a function for sharing a container image stored in the registry, between several client machines of the network that are distinct from one another; a function for downloading a container image stored in the registry, to a client machine of the network.

A good compromise is thus established between the great wealth of features offered by a container registry and the level of confidentiality required, which can be very high for certain container images, in particular against network parties who are usually considered to be above suspicion.

Other features and advantages of the invention will be apparent from reading the following description of a preferred embodiment of the invention, given as an example and with reference to the accompanying drawings.

DETAILED DESCRIPTION OF THE INVENTION

Figure 1:
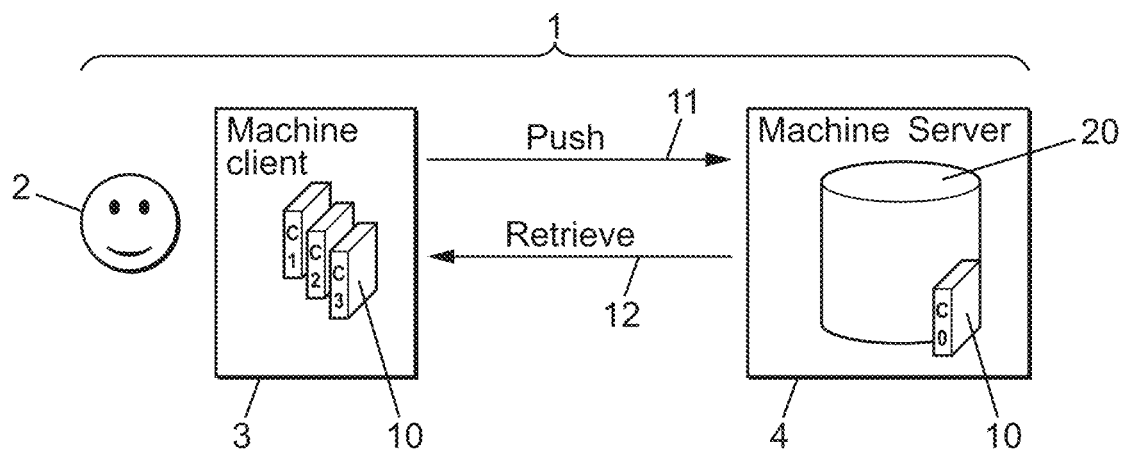
FIG. 1 schematically represents an example which highlights the security problem in an embodiment of the prior art.

FIG. 1 schematically represents an example which highlights the security problem according to one embodiment of the prior art.

In a high performance cluster (HPC) type of network 1, a user 2 creates on a client machine 3, stores or pushes 11 to the container registry 20 of a server machine 4, retrieves or collects 12 from the container registry 20 of the server machine 4, and uses by executing the corresponding containers on the client machine 3, one or more container images 10. A container image 10 corresponds to an initial state of a client machine 3 environment from which this container can then be executed. Examples of such container images are: C0, C1, C2, C3.

The user 2 sends to the container registry 20 his unencrypted, therefore accessible, container images 10. The server machine 4 receives these container images, stores them in the container registry 20, may possibly encrypt them, but since this server machine 4 has received unencrypted container images, a malicious or incompetent administrator can pirate these container images or allow them to be pirated, some of them possibly being confidential or even highly confidential.

Take for example a container registry 20 of Singularity-type containers, which exists in open source software. This container registry 20 is a central registry of container images 10 which makes it possible to manage, add, delete, or share these container images between several users, and in particular with users different than the user 2 from whom these container images originated.

Figure 2:
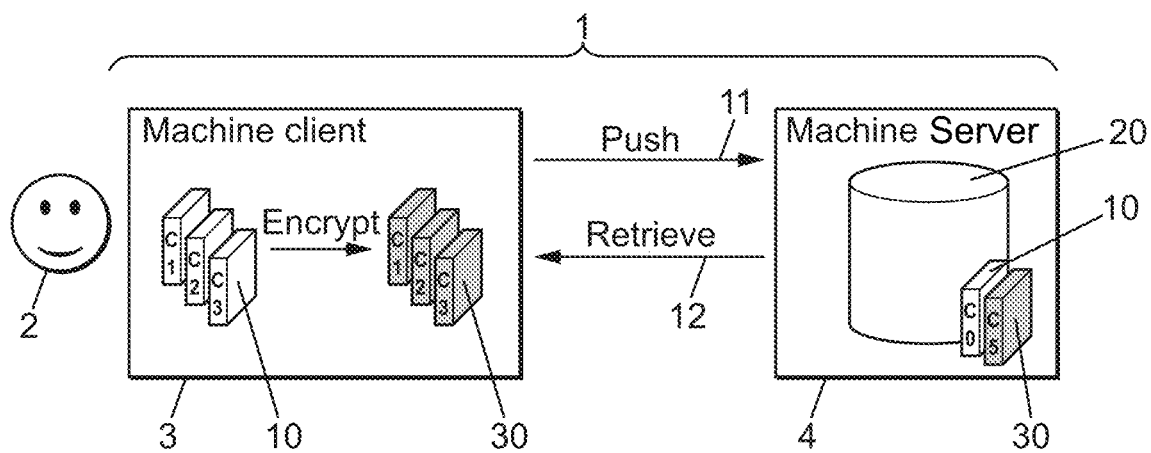
FIG. 2 schematically represents an example which highlights a solution to the security problem according to one embodiment of the invention.

FIG. 2 schematically represents an example which highlights a solution to the security problem according to one embodiment of the invention.

In a high performance cluster type of network 1, a user 2 creates on a client machine 3, stores or pushes 11 to the container registry 20 of a server machine 4, retrieves or collects 12 from the container registry 20 of the server machine 4, and uses by executing the corresponding containers on the client machine 3, one or more container images 10. A container image 10 corresponds to an initial state of a client machine 3 environment from which this container can then be executed. Examples of such container images are: C0, C1, C2, C3, C5.

A container registry 20 is a library of container images which are indexed therein, enabling their classification and retrieval; in other words the container registry 20 can be considered as a database of container images. A container registry can also be considered as offering a container image storage and distribution service, allowing users to push their container images to a central server machine, and to share them with other users while being able to retrieve them in order to modify or execute the containers corresponding to these container images stored in this container registry.

The user 2 sends to the container registry 20 his encrypted container images 30, which are therefore illegible without prior decryption. The server machine 4 receives these container images 30, stores them in the container registry 20, but cannot decrypt them because the server machine 4 has received the encrypted container images 30 and does not have the corresponding decryption key. As a result, even a malicious or incompetent administrator cannot pirate these encrypted container images or allow them to be pirated, their confidentiality remaining guaranteed even against the administrator of the container registry 20. However, the confidentiality of the container image 10, in this case C0, which has been stored unencrypted in the container registry 20 is not guaranteed.

To add the mechanism for encrypting container images which converts them into encrypted container images, an encryption procedure can be implemented in a command line of a script, which will enable encrypting the container image 10 before sending an encrypted container image 30 to the server machine 4. The user 2 wishing to encrypt his container image 10 therefore gives as input to this command line his symmetric key for this container image 10 which will be converted into an encrypted container image 30 at the client machine 3 before being pushed to the container registry 20 of the server machine 4. When the user 2 wishes to reuse this container image 30, he can retrieve it on the client machine 3, from the container registry 20 of the server machine 4 which is remote from the client machine 3, and can use his decryption key (identical to the encryption key if it is a symmetric key) to decrypt the container image 30 in order to reacquire the container image 10 which can be used to execute the corresponding container on the client machine 3.

Figure 3:
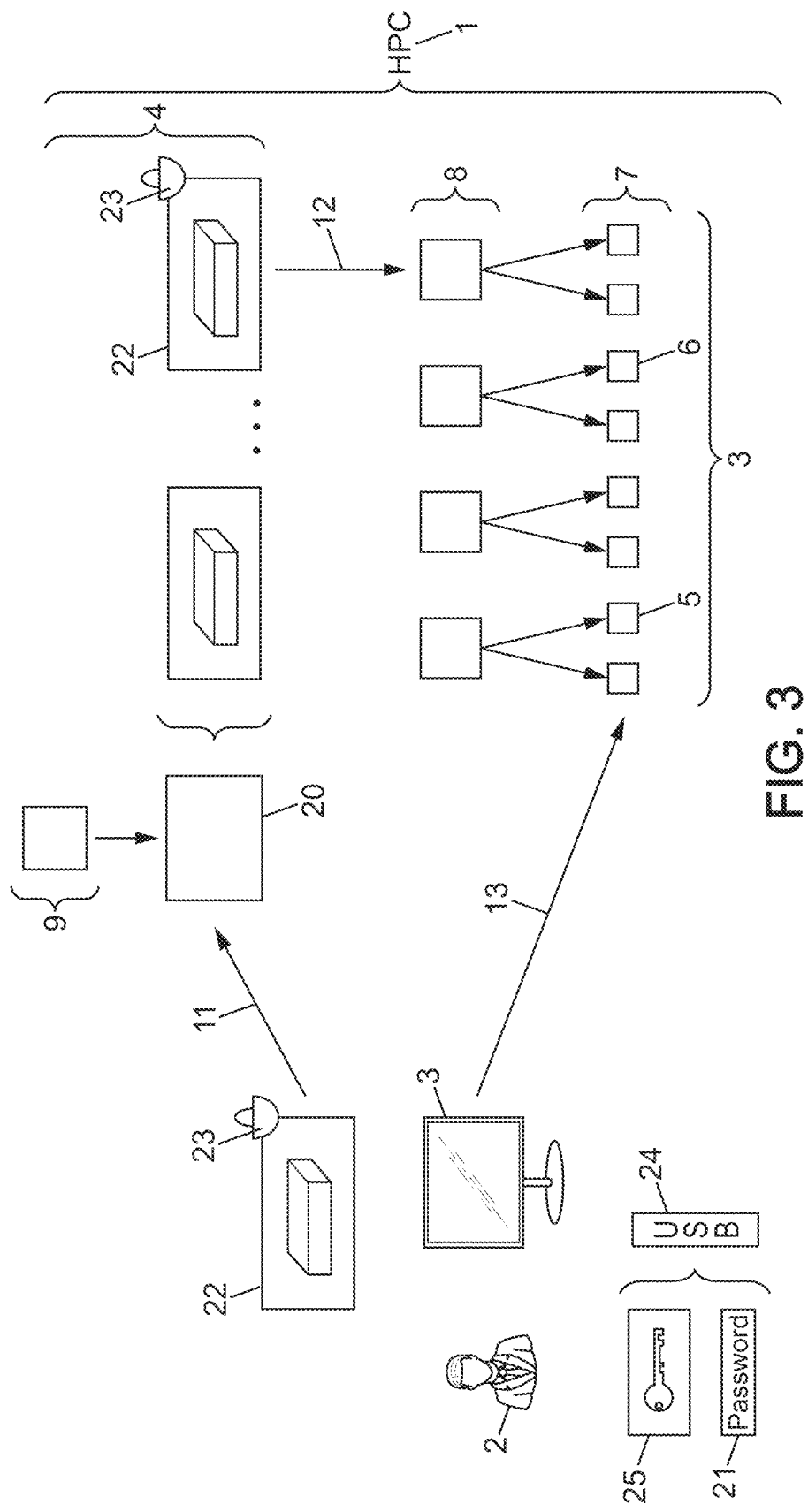
FIG. 3 schematically represents an example implementation of the secure storage method and the secure retrieval method, in a network, according to one embodiment of the invention.

FIG. 3 schematically represents an example implementation of the secure storage method and the secure retrieval method, in a network, according to one embodiment of the invention.

In a high performance cluster type of network 1, comprising a large number of compute nodes 7 grouped into groups of nodes respectively managed by administrators 8 of compute nodes 7, there is a container registry 20 hosted by a server machine 4 that is also part of the network 1. This server machine 4, and the container registry 20 it hosts, are managed by an administrator 9. The network 1 further comprises a client machine 3 of a user 2; in fact, there is a client machine 3 for each user 2, because there are several users, and there is even a large number of users in this high performance cluster type of network 1.

The user 2 works on the client machine 3 which is his input node in the network, but he can then change compute nodes to work on another of the compute nodes 7, for example node 5 or node 6. For example, the user 2 creates, on his client machine 3 serving as an input node, a container whose container image 22 is encrypted with a symmetric encryption key 25, therefore identical to the decryption key 25. This encryption is symbolized by the small key 23 attached to the container image 22. The user 2 does not store his symmetric encryption key 25 on his client machine 3, but on a peripheral device 24, for example a USB key 24 which remains under the control of the user 2. The symmetric encryption key 25 is itself stored in password-encoded form 21 on this USB key 24.

The user 2, after having encrypted the container image on his client machine 3, which is therefore an encrypted container image 22, therefore pushes it in encrypted form by sending 11 it to the container registry 20 of the server machine 4, which stores it. Because the stored container image 22 is encrypted and the administrator 9 does not have the symmetric encryption key 25, the administrator 9 can neither pirate this potentially confidential container image 22 nor allow it to be pirated. During encryption, the symmetric encryption key 25 is never located in the mass storage of the client machine 3, and is only temporarily stored in password-decoded form in the random access memory of the client machine 3 just for the time required to encrypt the container image 22, which makes hacking this symmetric encryption key at least very difficult, if not impossible, and in any case much more difficult than for the encryption methods of the prior art.

The user 2 is now on compute node 5, which is different from his input node. He wants to recover its container image 22, either to modify it or to execute the corresponding container on compute node 5. The user 2 brings back from the container registry 20, from the remote server machine 4, his container image 22 which is sent back to him on compute node 5. The user 2 separately sends from his client machine 3, by means of his USB key 24, the symmetric decryption key 25 in encoded form on the one hand and the password 21 for decoding the symmetric decryption key 25 on the other hand. The symmetric decryption key 25 is decoded by the password 21 only in the random access memory of compute node 5 and remains there only temporarily just for the time required to decrypt the container image 22 which, once decrypted, can be freely used by the user 2 on compute node 5. As the symmetric decryption key 25 is never in the mass storage of compute node 5, and in any case not in decoded form, and the password 21 never is either, it becomes very difficult for a malicious or incompetent administrator 8 of compute node 5 to hack this symmetric decryption key 25 or allow it to be hacked. Therefore, all container images 22 encrypted with this symmetric decryption key 25 will remain secure and their confidential character will be maintained. Here again, the hacking of this symmetric decryption key 25 at compute node 5 is made at least very difficult if not impossible, and in any case much more difficult than for the decryption methods of the prior art.

A user other than user 2, with whom user 2 wants to share his container image 22, is now on compute node 6, different from the input node of user 2 and from the previous compute node 5. This other user, working on compute node 6, would like to retrieve the container image 22 of user 2, who agrees to this. This other user wishes, for example, either to modify the container image 22 or to execute the container corresponding to this container image 22, on compute node 6 where he is working. This other user brings back from the container registry 20, from the remote server machine 4, this container image 22 which is sent back to him on compute node 6. The user 2 separately sends from his client machine 3, by means of his USB key 24, the symmetric decryption key 25 in encoded form on the one hand and the password 21 for decoding the symmetric decryption key 25 on the other hand. The symmetric decryption key 25 is decoded by the password 21 only in the random access memory of compute node 6 and remains there only temporarily just for the time required to decrypt the container image 22 which, once decrypted, can be freely used by this other user on compute node 6. As the symmetric decryption key 25 is never in the mass storage of compute node 6, and in any case not in decoded form, and the password 21 never is either, it becomes very difficult for a malicious or incompetent administrator 8 of compute node 6 to hack this symmetric decryption key 25 or allow it to be hacked. Therefore, all container images 22 encrypted with this symmetric decryption key 25 will remain secure and their confidential character will be maintained. Here again, the hacking of this symmetric decryption key 25 at compute node 6 is made at least very difficult if not impossible, and in any case much more difficult than for the decryption methods of the prior art.

Here, this other user must request authorization from user 2 who sends him, separately, the symmetric encryption key 25 in encoded form and the password 21 to decode it, the symmetric encryption key 25 and the password 21 only being located in the random access memory of compute node 6 and only temporarily just for the time required to decrypt this container image 22. Alternatively, this other user may also have the symmetric encryption key 25, in which case he can decrypt all the container images 22 of user 2 even without asking permission. In this latter case, however, user 2 agrees to give this other user unlimited access to all his container images 22, while in the first case he could filter this access, in other words authorize or deny access from one container image 22 to another container image 22.

Of course, the present invention is not limited to the examples and the embodiment described and shown, but is capable of numerous variants accessible to those skilled in the art.

The invention claimed is:

1. Method for the secure storage, in a network (1), of a container image (22) in a container registry (20), comprising:
   sending (11) a container image (22), the container image (22) corresponding to an initial state of a client machine environment which can subsequently be used to execute the container, from a client machine (3) of the network (1) to a container registry (20) of a server machine (4) of the network (1) that is remote from the client machine (3);
   encrypting (23) the container image (20), carried out in a random access memory of the client machine (3) before the sending step (11) to the server machine (4), so that the container image (22) is already encrypted when received by the container registry (20) for storage therein,
   wherein-an encryption key (25) of the container image (22) is usable in the random access memory of the client machine (3), inaccessible in a mass storage of the client machine (3), and inaccessible on the server machine (4).

2. Method for secure storage according to claim 1, wherein:
   the sending step (11) is carried out on an input node of the client machine (3) of the network (1),
   the encryption step (23) is carried out on the input node,
   the execution of the container is carried out on a compute node (5, 6) of the client machine (3) of the network (1), and
   the compute node (5, 6) is distinct from the input node.

3. Method for secure storage according to claim 1, wherein:
   the encryption key (25) is introduced in encoded form on the client machine (3),
   the encryption key (25) is accompanied by a decoding password (21) enabling it to be decoded, and
   the encoded encryption key (25) and the decoding password (21) are found together only in the random access memory of the client machine (3) in order to encrypt the container image (22).

4. Method for secure storage according to claim 1, wherein the encryption step (23) is preceded by a step of creating a container image (22) on the client machine (3).

5. Method for secure storage according to claim 1, wherein the encryption key (25) is a symmetric key.

6. Method for secure storage according to claim 1, wherein the step of encrypting (23) the container image (22) is carried out just before the step of sending (11) the container image (22), between the request to send the container image (22) made by a user (2) of the client machine (3) and the actual sending (11) of the encrypted container image (22) to the server machine (4).

7. Method for secure storage according to claim 1, wherein the step of encrypting (23) the container image (22) is integrated into a command line for the sending of the container image (22), from the client machine (3) to the server machine (4), in the form of an additional encryption layer.

8. Method for secure storage according to claim 7, wherein the encryption key (25) is passed as an argument of the command line for sending.

9. Method for secure storage according to claim 7, wherein the encryption step (23) is carried out automatically before any container image (22) is sent from the client machine (3) to the server machine (4).

10. Method for secure storage according to claim 7, wherein the encryption step (23) is carried out after automatically querying the user (2) of the client machine (3) followed by a user (2) of the client machine (3) accepting such encryption.

11. Method for the secure retrieval, in a network (1), of a container image (22) stored in a container registry (20), comprising:
   downloading (12) a container image (22) to a client machine (3) of the network (1), the container image (22) corresponding to an initial state of a client machine environment which can subsequently be used to execute the container, the image being stored in encrypted form in a container registry (20) of a server machine (4) of the network (1) that is remote from the client machine (3),
   decrypting the container image (22), carried out in a random access memory of the client machine (3), after the step of downloading (12) from the server machine (4), so that the container image (22) is still encrypted when received by the client machine (3),
   wherein a decryption key (25) of the container image (22) is usable in the random access memory of the client machine (3), inaccessible in a mass storage of the client machine (3), and inaccessible on the server machine (4).

12. Method for secure retrieval according to claim 11, wherein:
   the downloading step (12) is carried out on a compute node (5, 6) of the client machine (3) of the network (1),
   the decryption step is carried out on the compute node (5, 6),
   the execution of the container by using the decrypted container image (22) is carried out on the compute node (5, 6),
   the decryption key (25) is sent from an input node of the client machine (3) of the network (1) to the compute node (5, 6),
   the compute node (5, 6) is distinct from the input node, and
   the decryption key (25) is usable one time only in the random access memory of the compute node (5, 6) in order to carry out the decryption of the container image (22) to be decrypted in order to subsequently launch the execution of the container, but remains inaccessible via the mass storage of the compute node (5, 6).

13. Method for secure retrieval according to claim 11, wherein:
   the decryption key (25) is introduced in encoded form on the client machine (3),
   the decryption key (25) is accompanied by a decoding password (21) enabling it to be decoded, and
   the encoded decryption key (25) and the decoding password (21) are found together only in the random access memory of the client machine (3) in order to decrypt the encrypted container image (22).

14. Method for secure retrieval according to claim 13, wherein:
   the decryption key (25) is introduced in encoded form on the input node,
   the decryption key (25) is accompanied by a decoding password (21) enabling it to be decoded, and
   the encoded decryption key (25) and the decoding password (21) are sent separately from the input node to the compute node (5, 6) and are found together only in the random access memory of the compute node (5, 6) in order to decrypt the encrypted container image (22).

15. Method for secure retrieval according to claim 11, wherein the decryption key (25) is a symmetric key.

16. Method for secure retrieval according to claim 11, wherein the step of decrypting the container image (22) is integrated into a command line for the downloading of the container image (22) from the client machine (3) to the server machine (4), in the form of an additional decryption layer.

17. Method for secure retrieval according to claim 16, wherein the decryption key (25) is passed as an argument of the command line for downloading.

18. Method for secure storage according to claim 1, wherein:
   the container registry (20) comprises at least:
      a function for adding a container image (22) to the registry (20),
      a function for deleting a container image (22) from the registry (20),
      a function for sharing a container image (22) stored in the registry (20), between several client machines (3) of the network (1) that are distinct from one another; and
      a function for downloading (12) a container image (22) stored in the registry (20), to a client machine (3) of the network (1).

19. Method for secure retrieval according to claim 11, wherein:
   the container registry (20) comprises at least:
      a function for adding a container image (22) to the registry (20),
      a function for deleting a container image (22) from the registry (20),
      a function for sharing a container image (22) stored in the registry (20), between several client machines (3) of the network (1) that are distinct from one another; and
      a function for downloading (12) a container image (22) stored in the registry (20), to a client machine (3) of the network (1).

20. Network of nodes comprising a plurality of client machines, each client machine comprising at least one processor and memory, the network of nodes comprising a container registry (20) and being configured to use a secure storage method according to claim 1.

21. Network of nodes comprising a plurality of client machines, each client machine comprising at least one processor and memory, the network of nodes comprising a container registry (20) and being configured to use a secure retrieval method according to claim 11.

* * * * *